（12）United States Patent
Sato

US007005465B2

(10) Patent No.: US 7,005,465 B2
(45) Date of Patent: Feb. 28, 2006

(54) RESIN COMPOSITION FOR WIRE AND CABLE COVERINGS

(75) Inventor: Sho Sato, Utsunomiya (JP)

(73) Assignee: General Electric, Pittsfield, MA (US)

( * ) Notice: Subject to any disclaimer, the term of this patent is extended or adjusted under 35 U.S.C. 154(b) by 0 days.

(21) Appl. No.: 10/632,606

(22) Filed: Aug. 1, 2003

(65) Prior Publication Data

US 2004/0030012 A1    Feb. 12, 2004

(30) Foreign Application Priority Data

Aug. 7, 2002  (JP) ............................. 2002-230310

(51) Int. Cl.
  C08K 5/52           (2006.01)
(52) U.S. Cl. ...................... 524/140; 524/141; 524/143; 524/502; 524/504; 524/526
(58) Field of Classification Search ................ 524/140, 524/141, 143, 502, 504, 526
  See application file for complete search history.

(56) References Cited

U.S. PATENT DOCUMENTS

| | | | |
|---|---|---|---|
| 3,383,435 A | 5/1968 | Cizek | ........................ 525/132 |
| 3,994,856 A | 11/1976 | Katchman et al. | |
| 4,501,857 A | 2/1985 | Kishimoto et al. | |
| 4,879,330 A | 11/1989 | De Munck et al. | |
| 4,988,565 A | 1/1991 | De Munck et al. | |
| 5,034,441 A * | 7/1991 | Nakano et al. | ............. 524/117 |
| 5,109,068 A * | 4/1992 | Yamasaki et al. | ........... 525/151 |
| 5,165,990 A * | 11/1992 | Nakano | ................... 428/297.4 |
| 5,294,655 A | 3/1994 | Lee, Jr. et al. | |
| 5,364,898 A | 11/1994 | Lee, Jr. et al. | |
| 5,391,611 A * | 2/1995 | Funayama et al. | .......... 524/508 |
| 5,397,822 A | 3/1995 | Lee, Jr. | |
| 5,777,021 A * | 7/1998 | Nakano | ....................... 524/508 |
| 2003/0022968 A1 | 1/2003 | Imanishi | |

FOREIGN PATENT DOCUMENTS

| | | |
|---|---|---|
| DK | 340193 A | 8/1984 |
| EP | 210615 A | 2/1987 |
| EP | 318793 A | 6/1989 |
| EP | 356857 A | 3/1990 |
| EP | 422495 A | 4/1991 |
| EP | 501625 A1 | 9/1992 |
| EP | 546497 A2 | 6/1993 |
| EP | 587098 A1 | 3/1994 |
| EP | 587100 A1 | 3/1994 |
| EP | 0611802 | 10/1997 |
| EP | 0892979 | 5/2003 |
| JP | 63268709 A | 11/1988 |
| JP | 05279530 A | 10/1993 |
| JP | 07053815 A | 2/1995 |
| JP | 07062175 A | 3/1995 |
| JP | 07138433 A | 5/1995 |
| JP | 07292184 A | 11/1995 |
| JP | 07331003 A | 12/1995 |
| JP | 08143699 A | 6/1996 |
| JP | 09052958 A | 2/1997 |
| JP | 09052959 | 2/1997 |
| WO | 0 356 857 A | 3/1990 |
| WO | 0 422 495 A | 4/1991 |
| WO | WO 9636658 A1 | 11/1996 |
| WO | WO97/032928 | 9/1997 |
| WO | WO02/068532 | 6/1999 |
| WO | WO99/028388 | 6/1999 |

OTHER PUBLICATIONS

Chemical Abstracts Service, Okaka, Akihiko et al "Impact-resistance styrene polymer compositions" retrieved from STN database accession No. 122:316175 XP002264975.
JP02064140; Sumitomo Koji; Mar. 5, 1990; "Styrene-Based Resin Composition" (Abstract Only).
JP02092948; Nakano Akikazu; Apr. 3, 1990; "Flame-Retardant Resin Composition" (Abstract Only).
JP02218724; Yamazaki Michiaki; Aug. 31, 1990; "Draw Molded Body of Styrene-Based Resin and Production Thereof" (Abstract Only).
JP3126743; Nakano Akikazu; May 29, 1991; "Styrene-Based Resin Composition" (Abstract Only).
JP03174463; Akiyama Yoshikuni; Jul. 29, 1991; "Highly Elastic Hydrogenated Block Copolymer Composition" (Abstract Only).
JP0502267; Mizushiro Tsuyoshi; Aug. 10, 1993; "Elastomeric Composition" (Abstract Only).
JP05209098; Okada Akihiko; Aug. 20, 1993; "Thermoplastic Resin Composition" (Abstract Only).
JP06093151; Okada Akihiko; Apr. 5, 1994; "Polyester Resin Composition" (Abstract Only).
JP06093153; Okada Akihiko; Apr. 5, 1994; "Polystyrene Resin Composition" (Abstract Only).
JP06100754; Tsujimoto Motoyoshi; "Hydrogenated Block Copolymer Elastomer Composition" (Abstract Only).
JP08311196; Okada Akihiko; Nov. 26, 1996; "Production of Acid-Modified Polyphenylene Ether and Polystyrene Resin Composition" (Abstract Only).
JP2001310995; Furuta Motonobu; Nov. 6, 2001; "Resin Composition" (Abstract Only).
JP2001329162; Furuta Motonobu; Nov. 27, 2001; "Resin Composition" (Abstract Only).
JP2064140; Sumitomo Koji; Mar. 5, 1990; "Styrene-Based Resin Composition" (Abstract Only).
JP62104818; Ishihara Nobuhide; May 15, 1987; "Styrene Polymer" (Abstract Only).

* cited by examiner

*Primary Examiner*—Bernard Lipman

(57) ABSTRACT

The present invention offers a resin composition for user as a covering material for wires and cables that excels in fire retardancy with non-halogen, chemical resistance and melting properties, and also excels in workability, heat resistance, impact resistance and flexibility. A resin composition for wires and cables covering material is obtained by blending polyphenylene ether resin with syndiotactic polystyrene polymer, atactic polystyrene resin and non-halogen fire retardant or blending polyphenylene ether resin with syndiotactic polystyrene polymer, atactic polystyrene resin, non-halogen fire retardant and thermoplastic elastomer in fixed ratios.

6 Claims, No Drawings

RESIN COMPOSITION FOR WIRE AND CABLE COVERINGS

The present application is a U.S. non-provisional application based upon and claiming priority from Japanese Application No. 2002-230310, with a filing date of Aug. 7, 2002, which is hereby incorporated by reference.

BACKGROUND OF INVENTION

The invention relates to the resin compositions for wire and cable covering materials containing polyphenylene ether resin (abbreviated as PPE). More specifically, the invention relates to resin compositions for wire and cable covering materials that excel in non-halogen, fire retardancy and chemical resistance.

Generally, amorphous resins excel in dimensional precision after injection molding because of their amorphous structural characteristics. Taking advantage of this characteristic, they are widely used in the industrial applications involving large size molding objects where precision assembly is required. However, a consequence of the amorphous structure is organic chemical permeability resulting in weak chemical resistance and easy attacked by oil, organic solvent etc.

On the other hand, crystalline resins have outstanding chemical resistance because of their crystalline characteristic, and are used in applications involve exposure to oil, or organic solvent etc. However, when the crystallization advances in the mold cooling process, crystalline resins are not suitable for large size molded objects because of their low dimensional precision due to the molding shrinkage phenomenon. Although the inorganic fillers, such as glass fibers are added to improve dimensional stability, this results in high density, low ductility impact strength, and different shrinkages in the injection molding flow direction and perpendicular flow, and results in defects like warpage or deformation.

Polyphenylene ether resin is a non-crystalline thermoplastic resin with well-balanced mechanical properties, outstanding electrical properties and low water-absorbing property and excellent dimensional resistance. Moreover, polyphenylene ether resin is compatible with polystyrene resin which is also a non-crystalline thermoplastic resin, and can be modified easily. The resin composition (herein after, abbreviated to PPE/PS resin composition) containing PPE resin and styrene resin has outstanding molding processing characteristics and impact resistance (U.S. Pat. No. 3,383,435), and is widely used for automobile parts, electrical and electronic components. However, as mentioned above, PPE/PS resin composition is amorphous resin, and chemical resistance, specially resistance against aromatic hydrocarbon solvent is poor, e.g. if solvent is exposed to the part which is distorted or the part with residual strain, glaze or crack will occur and will lead to the rupturing of the components. Therefore, there are some restrictions in case of application, such as office equipment with a possibility of adhering to lubricating oil, grease, cleaner, components like computer related equipment (e.g., internal parts, fan motor case, plastic chassis); consumer electronics, business electrical appliances with a possibility of adhering to salad oil, fritter oil and other organic solvents; components of electrical equipment used in an environment of oily smoke, organic gas (e.g. industrial environment, construction-related), such types of applications are avoided. This is considered to be a defect resulting from polyphenylene ether resin being non-crystalline.

Although various experiments have been performed in order to improve the deficiency without affecting the characteristics of PPE/PS resin composition, the technology to improve the chemical resistance has not been obtained. As common prior art, the method of blending PPE/PS composition with crystalline resin, such as polyolefin (e.g., polyethylene, polypropylene, EEA), polyester, nylon etc.; low molecular weight olefin series (e.g. polybutene, ethylene oligomer etc.); and rubber type polymer (e.g., SEBS, SBS, SEPS rubber etc.), has been described. However, in this technology, chemical resistance is improved a little by small amounts of the additives, and if the additives amount is increased in order to demonstrate chemical resistance to a practical level, it brings about a fall in the outstanding mechanical strength, fire retardancy, or causes a delamination phenomenon at the time of the injection molding resulting from inadequate compatibility or causes a defect in dimensional precision at the time of molding in PPE/PS resin composition.

Additionally, alloys of crystalline resin and non-crystalline resin are also known, and as an example, an alloy of polyphenylene ether resin and nylon resin using a compatibilizer was prepared through extrusion compounding and was commercialized. In this technology, polyphenylene ether resin is distributed finely in the matrix of nylon, and the distribution is controlled by the compatibilizer and is called as non-compatible alloy. In other words, by covering polyphenylene ether resin by the nylon matrix, the chemical permeability to polyphenylene ether resin is suppressed, and the chemical resistance is improved. If judged from the view point of nylon, the low dimensional stability resulted from shrinkage during molding of nylon is improved by distributing polyphenylene ether resin in nylon. However, in this technology, the improvement in the dimensional precision is inadequate. It is clear that new technology to improve the chemical resistance of compositions containing polyphenylene ether resin is still needed.

Innovation in technology in recent years, has led to the development of crystalline polystyrene polymer having syndiotactic structure (hereinafter, abbreviated as syndiotactic styrene polymer or syndiotactic polystyrene polymer) in three-dimensional structure (Kokai No. 62-10481 etc.). As a logical extension, experimentation involving blending syndiotactic styrene polymer with various resins has been carried out. Syndiotactic styrene polymer is crystalline and from the styrene molecular structure is highly compatible with polyphenylene ether resin, like conventional atactic styrene polymer, and blend compositions of polyphenylene ether resin and syndiotactic styrene polymer are well-known. Such blend compositions have been described in various patents, such as Kokai no. 01-182344, Kokai no. 01-82350, Kokai no. 02-64140, Kokai no. 02-92948, Kokai no. 02-218724, Kokai no. 03-126743, Kokai no. 05-86296, Kokai no. 05-209098, Kokai no. 05-279530, Kokai no. 06-93151, Kokai no. 06-93153, Kokai no. 07-53815, Kokai no. 07-62175, Kokai no. 07-138433, Kokai no. 07-292184, Kokai no. 07-331003, Kokai no. 08-143699, Kokai no. 08-311196, Kokai no. 09-52958 and Kokai no. 09-52959. Although, various simple properties of alloys of syndiotactic styrene polymer and polyphenylene ether have been described in the above art, very few concrete examples which clarify the improvement in chemical resistance and the synergistic properties of the compositions are given. The improvement in chemical resistance is mentioned in Kokai no. 02-64140, Kokai no. 02-92948, Kokai no. 09-52958 and Kokai no. 09-52959. In the above publications, the chemical resistance is improved by simple addition of syndiotactic styrene polymer and rubber-type elastomer materials to polyphenylene ether resin and increasing the crystalline components, and since nothing has been taken into consideration about maintaining the dimensional precision (which is the feature of amorphous polyphenylene ether resin), these materials lack practical utility. Moreover, the chemical resistance of the compositions has been evaluated by a solvent immersion method involving observation of the appearance of the molded test after it has been immersed into a solvent of fixed quantity for a fixed interval of time. However, the application environments as mentioned above for polyphenylene ether resin is taken into consideration, issues where immersion and contact with solvent is required are not experienced. If a solvent, oil, etc. adheres to the drive circumference of electrical and electronic device by one of the factors during the use, and the issue is limited to the problem of dividing the area with clamping distortion in order to fix the components, polyphenylene ether resin which neither produces glaze nor a crack is desired that excels in chemical resistance when present in the distorted part.

Conventionally, PVC resin is widely used as the resin composition for wires and cables covering material. However PVC resin has low heat resistant temperature of 60° C., and contains halogen as fire retardant, which produces dioxin during combustion and pollutes the environment, and the regulations restricting its use are being tightened.

Additionally, tetrafluoroethylene can be used as the resin composition for wires and cables covering material. However, tetrafluoroethylene is fire retardant but possesses a disadvantage of drip inhibition, and is also processed with difficulty when blended with other resin composition. Moreover, as a consequence of thermal shrinkage, it fails the 5V test of UL94, and there is always a fear of short circuit by destruction of wires and cables covering material in case of a fire.

In addition, since tetrafluoroethylene contains fluoride, it is inherent in the problem of environmental pollution like the above-mentioned PVC resin.

The present invention solves the above mentioned issues with conventional technology, and offers a resin composition for wires and cables covering material, which is excellent in fire retardancy with non-halogen, excels in the chemical resistance, specifically in the distorted area and produces neither glaze nor a crack, and further has excellent compatibility, processability, heat resistance, impact resistance and flexibility.

DETAILED DESCRIPTION

In order to solve the above mentioned problems, the inventor has offered a resin composition where polyphenylene ether resin is blended with syndiotactic styrene polymer, styrene resin and non-halogen fire retardant in fixed ratio (hereinafter, abbreviated as resin composition I), or a resin composition obtained by blending polyphenylene ether resin with syndiotactic styrene polymer, styrene resin, non-halogen fire retardant and thermoplastic elastomer in fixed ratio (hereinafter, abbreviated as resin composition II), which is excellent in fire retardancy and chemical resistance, specifically in the distorted area, and further excels in processability, heat resistance, impact resistance and flexibility. In other words, according to first embodiment of this invention, it offers a resin composition for wires and cables covering material containing (A) polyphenylene ether 10 to 70 parts by weight, (B) syndiotactic styrene polymer 15 to 75 parts by weight, (C) styrene resin 0 to 50 parts by weight and (D) non-halogen fire retardant 5 to 40 parts by weight (but, components (A)+(B)+(C)+(D)=100 parts by weight). Furthermore, according to a second embodiment of this invention, it offers a resin composition for wires and cables covering material, which contains thermoplastic elastomer (E) 10–200 parts by weight with respect to 100 parts by weight of resin composition for wires and cables covering material. Moreover, according to a third embodiment of this invention, it offers a resin composition for wires and cables covering material, wherein component (A) is poly(2,6-dimethyl-1,4-phenylene)ether having intrinsic viscosity in the range of 0.08 to 0.60 dl/g when measured in chloroform at 30° C. in the first two embodiments.

Furthermore, according to a forth embodiment of this invention, it offers a resin composition for wires and cables covering material, wherein non-halogen fire retardant (D) is aromatic phosphoric ester in the first and third embodiments. Moreover, according to fifth embodiment of this invention, it offers a resin composition for wires and cables covering material, wherein above mentioned thermoplastic elastomer (E) is the block copolymer of styrene and butadiene or styrene and isoprene in the second embodiment.

Firstly, the I resin composition of the invention is explained in detail.

Polyphenylene Ether (Component (A))

The well known component (A) PPE resin can be used. PPE resin is the common name of the polymer having structure unit represented by general formula (I):

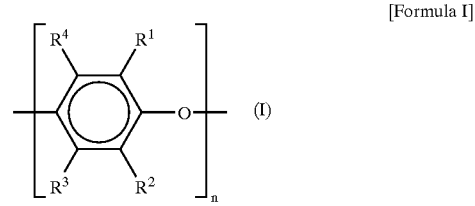

[Formula I]

wherein, $R^1$, $R^2$, $R^3$ and $R^4$ independently represents hydrogen atom, halogen atom, hydrocarbon group, substituted hydrocarbon group, alkoxy group, cyano group, phenoxy group or nitro group respectively, n is the value representing polymerization degree, and the polymer represented by general formula (I) can be used independently or can be used as copolymer formed by combining at least two kinds.

Specific examples of $R^1$, $R^2$, $R^3$ and $R^4$ are chlorine, bromine, iodine, methyl, ethyl, propyl, aryl, phenyl, benzyl, methylbenzyl, chloromethyl, bromomethyl, cyanoethyl, cyano, methoxy, ethoxy, phenoxy, nitro groups etc.

The preferred PPE resin is the polymer having $R^1$ and $R^2$ as alkyl group, specifically alkyl group having 1 to 4 carbon atoms, and $R^3$, $R^4$ as hydrogen atom or alkyl group having 1 to 4 carbon atoms. n is preferred to be at least 50.

Specific examples of polyphenylene ether resin are poly (2,6-dimethyl-1,4-phenylene)ether, poly(2,6-diethyl-1,4-phenylene)ether, poly(2-methyl-6-ethyl-1,4-phenylene) ether, poly(2-methyl-6-propyl-1,4-phenylene) ether, poly(2,6-dipropyl-1,4-phenylene)ether, poly(2-ethyl-6-propyl-1,4-phenylene)ether, poly(2,6-dimethoxy-1,4-phenylene)ether, poly(2,6-dichloromethyl-1,4-phenylene)ether, poly(2,6-dibromomethyl-1,4-phenylene)ether, poly(2,6-diphenyl-1,4-phenylene)ether, poly(2,6-ditolyl-1,4-phenylene)ether, poly (2,6-dichloro-1,4-phenylene)ether, poly(2,6-dibenzyl-1,4-phenylene)ether, poly(2,5-dimethyl-1,4-phenylene)ether etc. Amongst the various PPE resins, poly(2,6-dimethyl-1,4-phenylene)ether is generally preferred.

Moreover, when PPE resin is copolymer, tri-substituted alkyl phenol in the above mentioned repetitive polyphenylene ether unit e.g. copolymer having a part of group derived from 2,3,6-trimethylphenol, can be included. Further, in the PPE resin, copolymer having grafted styrene compound etc., can be used appropriately. As styrene compound grafted PPE, such as styrene, α-methylstyrene, vinyl toluene, chlorostyrene etc., copolymer obtained by graft polymerization are included.

Moreover, a modifier that has polar group can modify PPE resin. As polar group, such as acidic hydride, carbonyl group, acid anhydride, acid amide, carboxylate ester, azide, sulfon group, nitrile group, cyano group, isocyanate ester, amino group, imide group, hydroxyl group, epoxy group, oxazoline group, thiol group etc., are included.

The preferred intrinsic viscosity of PPE resin (measured at 30° C. using chloroform as a solvent) is 0.08 to 0.60 dl/g. When the intrinsic viscosity is below 0.08 dl/g, the obtained composition will have weak physical properties, such as mechanical strength and stretch, heat resistance etc., on the other hand if it exceeds 0.60 dl/g, it has the tendency of remarkably low workability. Therefore, neither is desirable.

The most preferred PPE resin is poly(2,6-dimethyl-1,4-phenylene)ether having intrinsic viscosity 0.12 to 0.51 dl/g (measured at 30° C. using chloroform as a solvent).

The component (A) polyphenylene ether resin is blended by 10 to 70 parts by weight, preferably 20 to 60 parts by weight with 100 parts by weight of resin composition I. If the blend ratio of component (A) is less than 10 parts by weight, the fire retardancy will be inadequate, on the other hand if it exceeds 70 parts by weight, chemical resistance will be weak and hence, neither is preferred.

Syndiotactic Styrene Polymer (Component (B))

Syndiotactic styrene polymer (B) used in the invention is styrene polymer having high degree syndiotactic structure. As syndiotactic structure, where phenyl group or substituted phenyl group is positioned alternatively on the opposite side of side chain corresponding to the primary chain that is formed by carbon-carbon bond, and the tacticity is determined by Nuclear Magnetic Resonance method($^{13}$C-NMR method). Nuclear Magnetic Resonance method($^{13}$C-NMR method) determines the existing ratio of constitutional block of successive units, such as diad in case of 2 units, triad when 3 units and pentad for 5 units. In the invention, it is desirable to use styrene polymer having syndiotacticity at least 75%, preferably at least 85% in diad or at least 30%, preferably at least 50% in case of racemic pentad. The examples of styrene polymer are polystyrene, poly(alkylstyrene), poly(halogenated styrene), poly(alkoxystyrene), poly(vinylbenzoate ester) and their mixtures, or copolymer comprising mainly of these components. Furthermore, as poly(alkylstyrene), such as poly(methylstyrene), poly(ethylstyrene), poly(isopropylstyrene), poly(t-butylstyrene) etc.; poly(halogenated styrene), such as poly(chlorostyrene), poly(bromostyrene), poly(fluorostyrene) etc. are mentioned. As poly(alkoxystyrene), such as poly(methoxystyrene), poly(ethoxystyrene) etc. are listed.

Amongst the above illustrated examples, specifically as styrene polymer, polystyrene, poly(p-methylstyrene), poly(m-methylstyrene), poly(p-tertiary-butylstyrene) are preferred, and further copolymer of styrene and p-methylstyrene can also be listed.

The preferred molecular weight of syndiotactic styrene polymer, although it is not restricted but generally weight-average molecular weight (Mw) is at least 10,000, and above all, the most appropriate is at least 50,000. If the weight-average molecular weight is less than 10,000, it has the tendency of weak chemical resistance. Furthermore, there are no restrictions about molecular weight distribution, and is appropriate for various things. The melting point of syndiotactic styrene polymer is in the range of 200 to 310° C., and has outstanding chemical resistance as compared to conventional styrene polymer having atactic structure.

Such kind of syndiotactic styrene polymer can be manufactured by carrying out the polymerization of the styrene monomer (monomer corresponding to the above-mentioned styrene polymer) in the absence of an inactive hydrocarbon solvent or solvent, using condensation product of titanium compound and trialkyl aluminium with water as catalyst (e.g., Kokai no. 62-104818, Kokai no. 63-268709). Moreover, commercial product can also be used.

The above mentioned syndiotactic styrene polymer can be modified by modifier which has polar group. As polar group, such as acidic hydride, carbonyl group, acid anhydride, acid amide, carboxylate ester, azide, sulfon group, nitrile group, cyano group, isocyanate ester, amino group, imide group, hydroxyl group, epoxy group, oxazoline group, thiol group etc., are included. Specifically, acid anhydride and epoxy groups are preferred as polar groups and amongst the acid anhydride, maleic anhydride is preferred.

The component (B) syndiotactic styrene polymer blends with 15 to 75 parts by weight, preferably 25 to 65 parts by weight to 100 parts by weight of resin composition I. If the blending ratio of component (B) is less than 15 parts by weight, the chemical resistance would be weak, on the other hand if more than 75 parts by weight, fire retardancy would be low, and therefore neither is preferred.

Styrene Resin (Component(C))

Styrene resin (C) used in the invention is the styrene resin not having syndiotactic structure other than above mentioned syndiotactic styrene polymer (B).

As styrene resin not having syndiotactic structure, homopolymer of styrene compound prepared by radical polymerization or styrene compound and the compound containing monomer that can be copolymerized, are mentioned. The examples of above mentioned styrene compound are styrene; alkyl substituted styrene, such as α-methylstyrene, α-ethylstyrene, α-methyl-p-methylstyrene, o-methylstyrene, m-methylstyrene, p-methylstyrene; halogenated styrene, such as o-chlorostyrene, m-chlorostyrene, p- chlorostyrene, p-bromostyrene, dichlorostyrene, dibromostyrene, trichlorostyrene, tribromostyrene etc. are listed, but styrene and α-methylstyrene are preferred most amongst the all.

Furthermore, styrene compound and monomer that can be copolymerized are vinyl cyanide, such as acrylonitrile, methacrylonitrile, fumaronitrile, maleonitrile or methyl methacrylate, methyl acrylate, methacrylic acid, acrylic acid, maleic anhydride, are listed, but acrylonitrile is preferred most amongst the all.

The component (C) styrene resin is blended by 0 to 50 parts by weight, preferably 10 to 40 parts by weight to 100 parts by weight of resin composition I. If the blend ratio of component (C) exceeds 50 parts by weight to 100 parts by weight of resin composition I, the chemical resistance would be weak and fire retardancy would also be low, and hence is not preferred.

Non-halogen Fire Retardant (Component(D))

Although various fire retardants other than a halogen fire retardant can be used as a non-halogen fire retardants (D) in the invention, but from the view point of safety and health, phosphate ester fire retardants are preferred.

As phosphate ester fire retardant, such as trimethyl phosphate, triethyl phosphate, tripropyl phosphate, tributyl phosphate, tripentyl phosphate, trihexyl phosphate, tricyctohexyl phosphate, triphenyl phosphate, tricresyl phosphate, trixylenyl phosphate, dimethyl ethyl phosphate, methyl dibutyl phosphate, ethyl dipropyl phosphate, hydroxyphenyl diphenyl phosphate etc. or their substituted compound are listed. The condensed phosphate ester that can be used in the invention is represented by the following general formula:

[Formula 2]

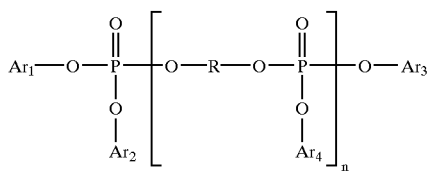

式中、R は下記式 A1～A4 より選ばれる基

 (A1)

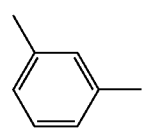 (A2)

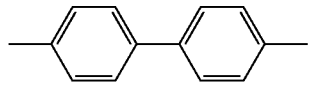 (A3)

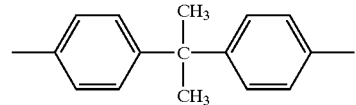 (A4)

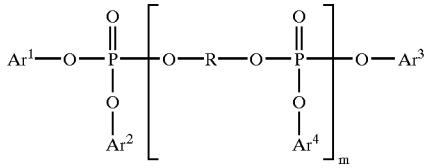

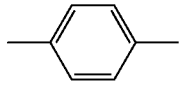 (A1)

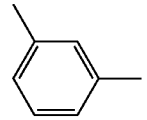 (A2)

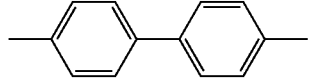 (A3)

-continued

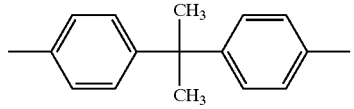 (A4)

wherein, R is the group selected from A1 to A4; wherein, n varies from 1 to 10, $Ar_1$ to $AR_4$ are phenyl group, tolyl group or xylyl group respectively. Further, when n is at least 2, multiple $AR_4$ maybe same or different). From the viewpoint of the fire retardancy and heat-resistant, it is desirable that R is the structure of (A4). These can be used independently or at least two types can also be used together. The preferred phosphate ester fire retardant is aromatic phosphate ester having aromatic group.

It is desirable that non-halogen fire retardant (D) is blended by 5 to 40 parts by weight, preferably 10 to 30 parts by weight corresponding to 100 parts by weight of resin composition I. If the blend ratio of component (D) is less than 5 parts by weight to 100 parts by weight of resin composition I, the fire retardancy is inadequate, on the other hand if exceeds 40 parts by weight, heat resistance becomes remarkably low, and hence neither is preferred.

The resin composition II comprises thermoplastic elastomer (E) in addition to the other above described component (A), component (B), component (C) and component (D).

Thermoplastic Elastomer (Component (E))

The thermoplastic elastomer (E) being used in the invention are styrene thermoplastic elastomer, polyolefin thermoplastic elastomer, polyester thermoplastic elastomer etc. Specifically, hydrogenated block copolymer of styrene and butadiene or styrene and isoprene of styrene thermoplastic elastomer, are preferred.

Hereinafter, hydrogenated product of styrene block copolymer is explained as follows. The preferred hydrogenated styrene block copolymer is obtained by the hydrogenation of block polymer comprising polymer block A of mainly at least 2 vinyl aromatic compound and polymer block B of mainly at least 1 conjugate diene compound, e.g., hydrogenated product of vinyl aromatic compound-conjugate diene compound block copolymer containing structure A-B-A, B-A-B-A, (A-B)$_4$—Si, A-B-A-B etc.

The hydrogenated block copolymer contains vinyl aromatic compound by 5 to 60% by weight, preferably 10 to 50% by weight, and further about the block structure, polymer block A mainly of vinyl aromatic compound is vinyl aromatic compound polymer block. Furthermore, if vinyl aromatic compounds exceeds 50% by weight, preferably vinyl aromatic compound of at least 70% by weight, it contains copolymer block structure of hydrogenated conjugate diene compound. Furthermore, block B of mainly hydrogenated conjugate diene compound is hydrogenated conjugate diene polymer block. If hydrogenated conjugate diene compound exceeds 50% by weight, preferably conjugate diene compound of at least 70% by weight, it contains copolymer block structure of vinyl aromatic compound.

Furthermore, polymer block A mainly of vinyl aromatic compound and polymer block B mainly of hydrogenated conjugate diene compound has random or tapered (the monomer components are increased or decreased as per molecular chain) distribution of molecular chain of vinyl aromatic compound or hydrogenated conjugate diene compound, or can be partial block or their arbitrary combination is also possible. When polymer block mainly of vinyl aromatic compound and polymer block mainly of hydrogenated conjugate diene compound are at least 2 blocks respectively, then each polymer block can either have the same structure or different structure.

Vinyl aromatic compound that forms the hydrogenated block copolymer are selected from below mentioned examples: styrene, α—methylstyrene, vinyltoluene, p-tertiary-butylstyrene, but styrene is preferred most. Further as conjugate diene compound before hydrogenation which forms hydrogenated conjugate diene compound are selected from butadiene, isoprene, 1,3-pentadiene, 2,3-dimethyl-1,3-butadiene etc. but the preferred one are butadiene, isoprene and their combination. Therefore polymer block of mainly conjugate diene compound before hydrogenation is the micro structure in the block that can be chosen arbitrarily, e.g. in polybutadiene block, the micro structure is 20 to 50%, preferably 25 to 45%.

In addition, average molecular weight of hydrogenated styrene block copolymer comprising above mentioned structure is in the range of 5,000 to 1000,000, preferably 10,000 to 800,000, and further preferred range is 30,000 to 500,000 and molecular weight distribution (Mw/Mn) (ratio of average molecular weight (Mw) and number average molecular weight (Mn)) is below 10. Furthermore, the molecular structure of hydrogenated block copolymer can be a straight chain, branched, radiation type or various combinations.

The block copolymer comprising above mentioned structure can be prepared by any of the method. According to preparation method mentioned in Kokai no. 40-23798, vinyl aromatic compound-conjugate diene compound block copolymer is synthesized in inactive solvent using lithium catalyst, and further can also be obtained by preparation method for hydrogenated vinyl aromatic compound-conjugate diene compound block copolymer mentioned in kokai no. 42-8704 and kokai no. 43-6636. Specifically, the hydrogenated block copolymer using titanium hydrogenated catalyst with outstanding weather resistance, heat-resistant degradation nature is preferred e.g., hydrogenated block copolymer can be synthesized by the method mentioned in Kokai no. 59-133203 and Kokai no. 60-79005 where hydrogenation is carried out in an inactive solvent in the presence of titanium hydrogenated catalyst.

At least 80% of hydrogenation is carried out on aliphatic double bond based on the conjugate diene compound of vinyl aromatic compound-conjugate diene compound block copolymer, and polymer block mainly of conjugate diene compound can be morphologically converted to olefin compound block polymer. Moreover, there is no restriction about the hydrogenation rate of aromatic double bond based on vinyl aromatic compounds that carries out copolymerization of polymer block A mainly of vinyl aromatic compound and polymer block B mainly of conjugate diene compound, if required, but hydrogenation rate less than 20% is preferred. The amount of non-hydrolyzed aliphatic double bond contained in block copolymer can be easily determined by infrared photometer, nuclear magnetic resonance apparatus etc.

In the resin composition II of the invention, thermoplastic elastomer (E) is blended by 10 to 200 parts by weight, preferably 20 to 150 parts by weight with respect to 100 parts by weight of resin composition I. If the blend ratio of component (E) is less than 10 parts by weight, the tensile elongation at break is inadequate, on the other hand if exceeds 200 parts by weight, the chemical resistance and fire retardancy would be low, and hence neither is preferred.

Additives

In the resin compositions I and II of the invention, other than above mentioned components (A) to (D), or components (A) to (E) commonly used additive agents, such as pigments, dyes, fire retardancy supporter, stiffener (e.g. glass fibre, carbon fibre, whisker etc.), filler (e.g. carbon black, silica, titanium oxide, mica, talc, calcium carbonate, potassium titanate, wollastonite etc.), heat resistant, antioxidant, weather resistant, ultraviolet absorbent, light stabilizer, lubricant, mold lubricant, nucleating agents, plasticizer (oil, low molecular weight polyethylene, epoxidized soybean oil, polyethyleneglycol, fatty acid ester, etc.), fluidity improving agent, antistatic agent, compatibilizer (dicarboxylic acid and anhydrate, such as maleic anhydride, citric acid), antibacterial agent etc., can be added during blending or molding of the resin composition within the limits which do not have any adverse effect on the invention.

The light stabilizer or ultraviolet absorbent, such as hindered amine compound, benzoate compound, benzotriazole compound, benzophenone or formamidine etc. are effective in granting and improving the weather resistance. Furthermore, nucleating agents, such as inorganic talc, metallic salts of aromatic carboxylic acid, organic nucleating agents, such as sorbitol or metallic salts of aromatic phosphoric acid are effective in granting and improving the rigidity and brittleness.

Preparation Method for the Resin Composition and Molded Object

There is no restriction for the preparation method of resin compositions I and II used in the invention, the usual method can be used satisfactorily, and the common melt-mixing method is suitably adopted. Although use of small amount of solvent is also possible, generally it is unnecessary. As melt and kneading apparatus, single screw extruder, twin-screw extruder, banbury mixer, roller mixer, kneader, brabender plastograph etc., are listed, but twin-screw extruder is preferred for melting and kneading methods. Since there are no restrictions for melting and kneading temperatures, but the common range is 150 to 350° C.

Thus, after insulating the electrical conductor, such as copper wire, wires and cables are manufactured using the obtained resin composition.

EXAMPLES

Although the following embodiments are used to explain the resin composition for wire and cable covering material in detail, the invention is not limited to it and can also deviate from the theme.

Furthermore, following compounds were used in the embodiments. Component (A): PPE resin: Intrinsic viscosity (chloroform, 30° C.) of poly(2,6-dimethyl-1,4-phenylene) ether (brand name: PP0646, manufactured by GE Plastic Japan Ltd.) is 0.46 dl/g.

Component (B): syndiotactic styrene polymer: molecular weight 18,0000, syndiotacticity represented by racemicpentad ratio is 98% of syndiotactic polystyrene as per $^{13}$C-NMR analysis (brand name: Zarrek 130ZC, obtained from Idemitsu Petrochemicals Ltd.).

Component (C): styrene resin: (C-1) styrene resin (GPPS) (brand name: CR-3500, obtained from Dainippon Ink and Chemicals Ltd.).

(C-2) High Impact Styrene resin (HIPS) (brand name: 870ST, obtained from Polystyrene Japan Ltd.).

Component (D): non-halogen fire retardant: compound represented by the following formula (i), but mixed compound having r=1 to 10 (brand name: CR733S, obtained from Daihachi Chemicals Co. ltd.)

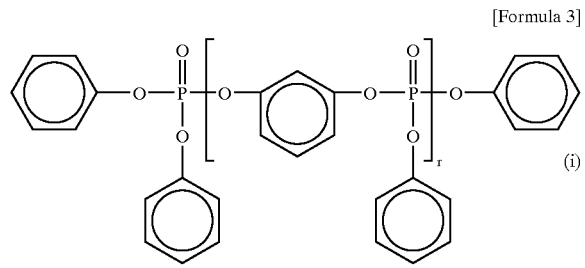

[Formula 3]

(i)

Component (E): Thermoplastic elastomer: (E-1) polystyrene-poly(ethylene-butylene)-polystyrene (SEBS) (brand name: Kraton G1650, obtained from Shell Chemicals Ltd.), (E-2) polystyrene-poly(ethylene-butylene)-polystyrene (SEBS) (brand name: Kraton G1651, obtained from Shell Chemicals Ltd.), Component (F): Liquid petroleum (brand name: Flexon 845, obtained from Esso Sekiyu Co. Ltd.), Component (G): Stabilizer 1: Phosphorous stabilizer (brand name: Mark 2113, obtained from Asahi Denka Kogyo Co. Ltd.), Component (H): Stabilizer 2: Phenol stabilizer (brand name: Mark A050, obtained from Asahi Denka Kogyo Co. Ltd.), Component (I): Stabilizer 3: zinc sulfide (brand name: SACHTOLITH HD, obtained from Sachtleben Co. ltd.), Component (J): Stabilizer 4: magnesium oxide (brand name: Kyowa Mag 150, obtained from Kyowa Chemical Industry Co. Ltd.)

Embodiments 1 to 3 and comparative examples 1 to 3

The pellets were manufactured by melting and kneading the components in the ratio as shown in table 1 by using 30 mm twin-screw extruder at melting temperature 280° C. and revolution speed 280 rpm. Further, test piece was prepared using the pellets at temperature 280° C. and tool temperature 60° C. by injection molding.

Moreover, the electric wire of outer diameter 0.94 mm was made using the obtained pellet at temperature 280° C. and linear velocity 130 to 260 m/hour.

The following characteristic evaluations were performed for the obtained test piece and electric wire. The results are shown in Table 1.

The measuring method used for characteristic evaluation is as follows:

(1) Tensile strength: measured in accordance with ASTM D638.
(2) Tensile elongation: measured in accordance with ASTM D638.
(3) Fire test: measured in accordance with UL1518.
(4) Chemical resistance test: measured in accordance with ISO6722. Further, chemical used was gasoline.

TABLE 1

| | | Embodiment 1 | Embodiment 2 | Embodiment 3 | Comparative Example 1 | Comparative Example 2 | Comparative Example 3 |
|---|---|---|---|---|---|---|---|
| Resin Composition (parts by weight) | | | | | | | |
| (A) PPE | | 27 | 17 | 42 | 27 | 67 | 67 |
| (B) s-PS | | 63 | 68 | 42 | — | — | 9 |
| (C-1) PS | | — | — | — | — | 9 | — |
| (C-2) PS | | — | — | — | 63 | — | — |
| (D) Fire retardant | | 10 | 15 | 16 | 10 | 24 | 24 |
| (E-1) Elastomer | | — | 45 | — | — | 45 | 45 |
| (E-2) Elastomer | | — | — | 45 | — | — | — |
| (F) Liquid petroleum | | — | 5 | 5 | — | 5 | 5 |
| (G) Stabilizer 1 | | 0.5 | 0.5 | 0.5 | 0.5 | 0.5 | 0.5 |
| (H) Stabilizer 2 | | — | 0.5 | 0.5 | — | 0.5 | 0.5 |
| (I) Stabilizer 3 | | 0.1 | 0.1 | 0.1 | 0.1 | 0.1 | 0.1 |
| (J) Stabilizer 4 | | 0.1 | 0.1 | 0.1 | 0.1 | 0.1 | 0.1 |
| Evaluation parameter | Unit | Characteristics Evaluation result | | | | | |
| Tensile strength | Mpa | 68 | 34 | 35 | 36 | 25 | 25 |
| Tensile elongation | % | 5 | 74 | 17 | 64 | 95 | 85 |
| Fire Retardancy ULVW-1 | — | OK | OK | OK | OK | OK | OK |
| Chemical resistance | — | OK | OK | OK | NG | NG | NG |

The resin composition for wires and cables covering material is excellent in fire retardancy with non-halogen, chemical resistance and melting properties, and since it also excels in workability, heat resistance, impact resistance and flexibility, the industrial utility value as a resin composition for wire cable covering material is extremely high.

What is claimed:

1. A resin composition consisting essentially of: (A) 10 to 70 parts by weight polyphenylene ether, (B) 15 to 75 parts by weight syndiotactic polystyrene polymer, (C) 10 to 40 parts by weight stactic polystyrene resin, (D) 5 to 40 parts by weight non-halogen fire retardant wherein the sum of components (A)+(B)+(C)+(D)=100 parts by weight, and (E)

hydrogenated styrene block copolymer in an amount of 10 to 200 parts by weight with respect to 100 parts by weight of resin composition wherein the hydrogenated block copolymer has a molecular weight distribution below 10 and the composition has a tensile strength greater than or equal to 34 and a tensile elongation greater than 5 when determined according to ASTM D638.

2. The resin composition of claim 1, wherein the polyphenylene ether component is poly(2,6-dimethyl-1,4-phenylene)ether having intrinsic viscosity in the range of 0.08 to 0.60 dl/g when measured in chloroform at 30° C.

3. The resin composition of claim 1, wherein the non-halogen fire retardant is an aromatic phosphoric ester.

4. The resin composition of claim 1, wherein the hydrogenated styrene-block copolymer is a block copolymer of styrene and butadiene or styrene and isoprene.

5. A wire covering made from the resin composition of claim 1.

6. A cable covering made from the resin composition of claim 1.

* * * * *